US009303356B2

United States Patent
Manninen

(10) Patent No.: US 9,303,356 B2
(45) Date of Patent: Apr. 5, 2016

(54) FILM STRUCTURES FOR SELF LOCKING NONWOVEN INDUSTRIAL TEXTILE

(71) Applicant: AstenJohnson, Inc., Charleston, SC (US)

(72) Inventor: Allan R. Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 0 days.

(21) Appl. No.: 14/432,953

(22) PCT Filed: Oct. 1, 2013

(86) PCT No.: PCT/CA2013/000842
§ 371 (c)(1),
(2) Date: Apr. 1, 2015

(87) PCT Pub. No.: WO2014/053055
PCT Pub. Date: Apr. 10, 2014

(65) Prior Publication Data
US 2015/0267348 A1      Sep. 24, 2015

(30) Foreign Application Priority Data

Oct. 4, 2012    (CA) ...................................... 2791864

(51) Int. Cl.
*D21F 1/00*     (2006.01)
*B32B 38/06*    (2006.01)
(Continued)

(52) U.S. Cl.
CPC ............ *D21F 1/0036* (2013.01); *B01D 39/083* (2013.01); *B32B 3/06* (2013.01); *B32B 3/266* (2013.01); *B32B 3/28* (2013.01); *B32B 3/30* (2013.01); *B32B 5/022* (2013.01);
(Continued)

(58) Field of Classification Search
CPC .............................................. Y10T 428/24289

USPC .................................... 24/449; 428/223, 596
See application file for complete search history.

(56) References Cited

U.S. PATENT DOCUMENTS

| 6,124,015 A | 9/2000 | Baker et al. |
| 2003/0190451 A1 | 10/2003 | Baker et al. |
| 2005/0233111 A1 | 10/2005 | Best |

FOREIGN PATENT DOCUMENTS

CA       2738918 A1    11/2011

OTHER PUBLICATIONS

International Search Report and Written Opinion dated Dec. 10, 2013 for International Application No. PCT/CA2013/000842, International Filing Date: Oct. 1, 2013 consisting of 7-pages.

*Primary Examiner* — Adam Krupicka
(74) *Attorney, Agent, or Firm* — Christopher & Weisberg, P.A.

(57) ABSTRACT

A profiled film structure, textiles comprising at least two layers of the structure, and methods of making the structure and textiles. Each film layer is profiled with regularly arranged protrusions, separated by planar land areas. Portions of at least one side wall of the protrusions are slit to create apertures extending through the film and top members forming coplanar latching means extending over the apertures. When the upper surface of a first layer of the film is brought into contiguous relationship with the upper surface of a second layer of the film, and the protrusions of each of the respective layers are aligned between adjacent protrusions of the other layer, the latching means of each layer are received and retained within the apertures of the opposing layer, resulting in an efficiently assembled self-locking structure having selectable permeability for fluid flow through the structure.

15 Claims, 13 Drawing Sheets

(51) Int. Cl.

| | |
|---|---|
| *B32B 3/06* | (2006.01) |
| *B32B 3/30* | (2006.01) |
| *F16B 5/07* | (2006.01) |
| *B32B 38/00* | (2006.01) |
| *B32B 5/02* | (2006.01) |
| *B32B 5/24* | (2006.01) |
| *B32B 15/04* | (2006.01) |
| *B32B 15/18* | (2006.01) |
| *B32B 15/20* | (2006.01) |
| *B32B 27/06* | (2006.01) |
| *B32B 3/26* | (2006.01) |
| *B01D 39/08* | (2006.01) |
| *B32B 3/28* | (2006.01) |
| *B32B 15/01* | (2006.01) |
| *B32B 27/08* | (2006.01) |
| *B32B 27/28* | (2006.01) |
| *B32B 27/36* | (2006.01) |
| *D21F 7/08* | (2006.01) |
| *D21F 7/12* | (2006.01) |

(52) U.S. Cl.
CPC ................ *B32B 5/24* (2013.01); *B32B 15/011* (2013.01); *B32B 15/016* (2013.01); *B32B 15/04* (2013.01); *B32B 15/18* (2013.01); *B32B 15/20* (2013.01); *B32B 27/06* (2013.01); *B32B 27/08* (2013.01); *B32B 27/281* (2013.01); *B32B 27/36* (2013.01); *B32B 38/0004* (2013.01); *B32B 38/06* (2013.01); *D21F 7/083* (2013.01); *D21F 7/12* (2013.01); *F16B 5/07* (2013.01); *B32B 2250/02* (2013.01); *B32B 2250/24* (2013.01); *B32B 2309/10* (2013.01); *B32B 2311/00* (2013.01); *B32B 2437/00* (2013.01); *Y10T 428/12361* (2015.01); *Y10T 428/24322* (2015.01)

FILM STRUCTURES FOR SELF LOCKING NONWOVEN INDUSTRIAL TEXTILE

CROSS-REFERENCE TO RELATED APPLICATIONS

This application is a submission under 35 U.S.C. §371 for U.S. National State Patent Application of, and claims priority to, International Application Number PCT/CA2013/000842, entitled FILM STRUCTURES FOR SELF LOCKING NONWOVEN INDUSTRIAL TEXTILE, filed Oct. 1, 2013, which International Application is related to and claims priority to Canadian Application Serial No. 2,791,864, entitled FILM STRUCTURES FOR SELF LOCKING NONWOVEN INDUSTRIAL TEXTILE, filed Oct. 4, 2012, the entirety of all of which is incorporated herein by reference.

FIELD OF THE INVENTION

The invention concerns film structures and textiles formed from at least two layers of selectively slit and profiled polymeric film. It is particularly concerned with such textiles in which the protrusions and slit openings are structured and arranged so that, when two similarly formed film layers are brought together in alignment such that the protrusions of one layer are positioned between those of the second, the resulting structure is self locking due to the interconnection of the top surfaces of the protrusions of one layer with openings in the sides of the protrusions in the opposing layer. The resulting two layer structure requires no additional bonding and is resistant to compressive loading, and the aperture sizes can be selected to provide a desired permeability, and thus has application in a wide variety of industrial processes, such as for conveyance, filtration and separation, and in particular for papermaking fabrics.

BACKGROUND OF THE INVENTION

Industrial textiles comprising two layers of slit and profiled film are known. For example, WO 2011/069259 to Manninen discloses industrial textiles made from at least one layer of selectively slit and profiled polymeric film which are embossed to impart surface contouring and other properties similar to those resulting from various weave designs for woven fabrics. The film is pressed by application of heat and pressure using a chosen mold pattern so as to selectively and permanently deform portions out of plane; a slitting process is used to create apertures at the deformations to allow the passage of fluids such as air and water through the fabric. The length of the individual slits is equal to the length of the aperture formed in the film. The document also discloses that a two layer fabric can be provided in which a first layer of a suitably slit and embossed film is mated with a second similarly imprinted sheet so that the outer surfaces of the deformations formed by the embossing processes face one another. The two layers must be secured together, for example by welding, such that the upper protrusion surfaces of a first film layer are joined to the land areas of a similarly slit and profiled second film layer to create the assembled film structure.

It is known from CA 2,779,969 to Manninen to provide industrial fabrics for conveying in an industrial process which are formed from two layers of profiled and aperture film, where at least some of the protrusions on the film surface are provided with a first end integral with a contiguous land area and an opposing second end having either a detached free end or a weakened end portion arranged to be detachable from a contiguous land area in response to strain. The film provides flexibility to allow controlled relative movement of the layers to minimize the effects of internal strain.

It is further known from CA 2,779,131 to Manninen to provide a nonwoven film fabric comprising two planar polymeric films which are thermoformed according to a desired embossing pattern. The embossments are shaped such that either at least two end walls are provided with a shell-like configuration, or the side walls are materially reinforced due to the chosen slitting pattern. The size and location of the slits may be adjusted as required so as to impart a desired permeability. Nonwoven fabrics assembled from two like interengaged layers exhibit improved resistance to compressive loading in comparison to similar prior art fabrics, allowing them to maintain a void volume between the film layers and thus the chosen permeability.

U.S. Pat. No. 4,541,895 to Albert discloses a nonwoven laminated multilayer construction of unoriented polymer material, with laser drilled drainage apertures.

US 2007/0134467 to Sayers discloses a structure in which a series of film layers are laminated together and perforated to provide through openings. Perforations are cut in at least one of the film layers after the layer is secured to another layer or layers having pre-cut perforations. The size of the holes and depth of cut is varied by adjusting the laser.

US 2011/0250355 to Allum et al. discloses a method for producing a topographic pattern on a continuous longitudinal polymer fabric strip, the pattern being applied to an area of the continuous strip to be imprinted by means of an application device and the application device moving in relation to the strip in a direction which is parallel to the transverse orientation.

From WO 2005/019531 to Fitzpatrick it is known to provide a grooved and vented industrial process belt including a porous membrane which has a porous polymer coating, a permeable polymer film or an assembly of short fibers or multifilaments. The porous polymer coating can be produced by laser drilling, removal of a soluble component, mechanical punching or by applying a resin as a reticulated or nonreticulated foam.

It is known from WO 2008/145420 to Bez et al. to provide a papermaking fabric comprising a plurality of films of polymer material which are laminated on one another, wherein the films each have a plurality of perforations which extend through their thickness to provide drainage channels. The perforations may be formed by removal of a filler from the polymer of which the films are comprised.

US 2010/0236740 to Mourad et al. discloses a nonwoven industrial belt comprised of at least one film layer which has been laser drilled to form shaped through openings to enhance topography of a sheet product conveyed thereon.

From WO 2008/112612 to Levine et al. it is known to provide a suction tape for use as a tobacco conveyor belt that is formed from a continuous polymeric film containing a polymer chosen to maximize the wear resistance and minimize toxicity of any polymer contaminating the tobacco. The tape is permeable and perforated according to a desired distribution by embossing mechanically, ultrasonically, or through a laser removal technique.

WO 2012/028601 to Eberhardt et al. discloses a perforated film fabric formed from a single layer or sheet of film. The lateral edges are not perforated, while the central area of the film fabric includes a plurality of pores which form passages between the two opposing surfaces of the belt.

WO 2012/123439 to Straub et al. discloses a papermaking fabric including a first and second layer each of which is formed by one or more film-shaped tapes which adjoin one another and are arranged next to one another in the CD. The tapes are arranged such that their lateral and longitudinal edges in a first layer are offset relative to those in a second layer. The tapes in one layer are bonded by one of various means to those in the other layer.

While industrial textiles made in accordance with the teachings of the above prior art may be satisfactory in certain applications, in each case, the component film layers are not self-locking or interlockable in a manner which allows them to be permanently or semi-permanently joined together, and must be joined together in a separate bonding process in order to form the completed structure, by aligning each film layer relative to the other and bonding, which process is time consuming and may introduce inaccuracies into the resulting structure.

It would thus be highly desirable to provide a patterned and apertured film structure formed from at least two film layers, each of which was interlockable or autojoinable with the other during a single assembly process. It would be further desirable if the interlocking means provided an interconnection which was sufficiently robust such that the resulting structure was self-retaining and did not require an additional bonding step such that the two film layers would be retained in their joined configuration, but allowing for minor movements to accommodate and minimize the effects of internal strain. It would also be desirable if the interlocking means substantially prevented or eliminated any opportunity for misalignment of the two film layers to be joined. It would further be desirable if, when the film structure is intended for use as an industrial textile, a seaming component could be incorporated into the assembly. The present invention addresses this need, by providing film structures which are self-locking and are assembled from two similarly profiled film layers each of which includes protrusions and apertures which interact to provide an integrated structure having features somewhat similar to those of a woven textile, such as an internal void volume, permeability and diagonal apertures through the assembled structure which allow for passage of fluids through the assembly.

SUMMARY OF THE INVENTION

The invention therefore seeks to provide a film structure comprising a film having
  (i) an upper surface and a lower surface; and
  (ii) a plurality of protrusions separated by land areas and defining a profile of the upper surface, wherein
    (a) each protrusion has a body comprising a top member having opposed first and second lateral edges and is supported by opposed first and second end walls;
    (b) at least one of the lateral edges cooperates with the end walls to define an aperture extending through the film from the upper surface to the lower surface; and
    (c) the top member comprises a coplanar latching means extending over the aperture, wherein when the upper surface of a first layer of the film is brought into contiguous relationship with the upper surface of a second layer of the film, and the protrusions of each of the respective layers are aligned between adjacent protrusions of the other layer, the latching means of the first layer are received and retained within the apertures of the second layer, and the latching means of the second layer are received and retained within the apertures of the first layer.

Preferably, the top member is substantially planar. Preferably also the first and second end walls are compression resistant. Preferably such compression resistance is provided by a structure wherein for each protrusion, each end wall has a base edge connected to an adjacent land area of the film structure, and has a configuration selected from at least one of
  (a) the base edge being convexly curved away from the protrusion body; and
  (b) each end wall extending below at least a part of each of the first and second lateral edges and being connected to each of the first and second lateral edges.

The invention also seeks to provide a two-layer film structure comprising a first layer and a second layer each constructed according to the invention, wherein the protrusions of each of the respective layers are aligned between adjacent protrusions of the other layer and the latching means of each layer are secured within the apertures of the opposing layer.

In order to provide the physical properties sufficient to allow industrial textiles using the film structures of the invention to survive the various rigors of the environment for which they are intended, for many intended end uses, preferably the film structure is constructed of a thermoplastic polymer material; but for some uses, it may be constructed of a thermoset polymer material such as commercially available polyimides which are sold in the marketplace under the tradenames Apical™, Kapton™, UPILEX™, VTEC PI™, Norton TH™ and Kaptrex™; others may be suitable; or a formable metal material, in particular a formable metal material selected from at least one of aluminum alloy, brass, cold rolled steel, copper, galvanized steel, high strength low alloy steel, hot rolled steel, steel alloys, stainless steel and zinc. As used herein, the phrase "formable metal material" refers to a metal that that can undergo strain beyond the elastic limit of the material without causing excessive strain localization, fracture or permanent deformation.

Preferably the film structures will be formed from a medium to high intrinsic viscosity (IV) polyester selected from one of polyethylene terephthalate (PET), polybutylene terephthalate (PBT), polyethylene naphthalate (PEN), poly (cyclohexylene dimethylene terephthalate) acid (PCTA), in many cases most preferably PET, and having an IV between about 0.5 and 1.0. At least one layer of the PET film may also be hydrolytically stabilized to prevent premature depolymerization when the film structure is intended for use in hot and moist environments due to hydrolytic degradation; carbodiimides are preferred for such application. Such films are described by Manninen in CA 2,778,513 the disclosure of which is herein incorporated by reference. As disclosed in the '513 application, the film is oriented in both the machine and transverse direction to maximize its elastic modulus and other physical properties, in particular its tensile strength and its free shrinkage. Preferably the film is comprised of at least two and preferably three coextruded miscible layers in which at least one outer layer comprises from 5% to 20% of the overall film thickness or caliper, which may be from about 100 µm up to 500 µm, but in most cases preferably in the range of about 250 µm to 350 µm.

Preferably, the film thickness is in the range of 100 µm to 500 µm. Where the film comprises two layers, preferably a first layer comprises from 5% to 15% of the film thickness and the second layer comprises from 85% to 95% of the film thickness; and more preferably the first layer comprises substantially 10% of the film thickness and the second layer comprises substantially 90% of the film thickness.

Where the film comprises three layers, preferably each outer layer comprises from 5% to 20% of the film thickness and an inner layer comprises from 60% to 90% of the film thickness; and more preferably each outer layer comprises from 10% to 15% of the film thickness and the inner layer comprises from 70% to 80% of the film thickness.

Preferably the film, or at least one layer of a multilayer film, comprises a hydrolytic stabilizer comprising a carbodiimide.

Preferably, for each layer comprising a hydrolytic stabilizer, the carbodiimide comprises between 0.5% parts by weight (pbw) and 5% pbw of the material of that layer. Preferably also the carbodiimide is selected from a monomeric form and a polymeric form; more preferably the carbodiimide is polymeric.

Preferably, the film is stretched in each of a longitudinal and a transverse direction by a factor of from two to at least four, more preferably by a factor of at least three. The resulting film is subsequently annealed, cooled and formed into rolls for later use.

Optionally, at least one layer further comprises an additive, such as at least one of carbon black, titanium dioxide, and at least one dye.

Optionally, at least one layer further comprises an antiblock agent.

Alternatively, at least one layer further comprises a radiant energy absorbent material.

Optionally, the film structures can comprise a reinforcing means, preferably comprising a polymeric monofilament inserted through adjacent apertures alternating between the first layer and the second layer.

Optionally, for a two layer film structure, the protrusions of the first layer have a profile height which is greater than a profile height of the protrusions of the second layer.

The invention further seeks to provide an industrial textile comprising at least one layer of a film structure according to the invention.

Preferably, the industrial textile further includes an integral seam region. Where the industrial textile comprises opposing seamable end regions, preferably a pair of seaming elements is bonded to the respective opposing seamable end regions.

The invention further seeks to provide an industrial textile comprising a two-layer film structure according to the invention.

Preferably, the industrial textiles of the invention are for use in a process selected from conveyance, filtration and separation; and preferably, the process comprises papermaking, and the industrial textile is selected from a forming fabric, press felt, dryer fabric and a through-air dryer fabric.

The invention also seeks to provide a method of constructing an industrial film structure, the method comprising the steps of (a) providing a film having an upper surface and a lower surface;

(b) selectively applying pressure to selected portions of the film to form protruding embossed areas separated by land areas, creating a contoured profile in the upper surface, each protruding embossed area comprising a top member having opposed sidewalls connected to the top member at first and second lateral edges; and (c) selectively cutting and removing material from at least one of the sidewalls to define protrusions each having a body supported by opposed compression resistant first and second end walls and to define at least one aperture extending from the upper surface to the lower surface, wherein the top member comprises a coplanar latching means extending over the aperture, such that when the upper surface of a first layer of the film is brought into contiguous relationship with the upper surface of a second layer of the film, and the protrusions of each of the respective layers are aligned between adjacent protrusions of the other layer, the latching means of the first layer are received and retained within the apertures of the second layer, and the latching means of the second layer are received and retained within the apertures of the first layer.

The invention also seeks to provide a method of constructing a nonwoven industrial fabric, the method comprising the steps of (a) providing two layers of a film structure, each layer being constructed according to the invention;

(b) aligning selected protruded embossed areas of the first layer with land areas of the second layer, and aligning selected protruded embossed areas of the second layer with land areas of the first layer;

(c) applying pressure to at least one of the first layer and the second layer to engage the latching means of the protrusions of the first layer within the apertures of the second layer, and to engage the latching means of the protrusions of the second layer within the apertures of the first layer, to secure the first layer to the second layer.

For the methods of the invention, the preferred materials for the film or film structure will be as noted above in relation to the film structures of the invention.

As described herein, the film structure of the present invention is comprised of two film layers each of which is similarly profiled in an embossing process to provide a chosen pattern of protrusions, each of which is separated from adjacent protrusions by generally planar land areas which, together, define a profile to the surfaces of the film layers. Each protrusion is initially provided as a generally frustoconical shape including a top surface which may be generally planar and which is coplanar with all of the other protrusions in the film layer, and is supported by the side walls and end walls of the protrusion. At least one and preferably both of the side walls are then cut away in a slitting process which passes through the film thickness to leave behind first and second end walls which may be configured so as to be compression resistant. The lateral edges of the top surface of a protrusion cooperate with the two end walls to define at least one aperture extending through the film from the upper surface to the lower surface.

The top surfaces of each protrusion provide a coplanar latching means extending over the or each of the apertures. When the upper surface of a first layer of the profiled and slit film is brought into contiguous relationship with the upper surface of a second and similarly profiled layer of film, and the protrusions of each of the respective layers are aligned between adjacent protrusions of the other layer, the latching means of the first layer are now received by and retained within the apertures of the second layer, thereby joining the two film layers together. A small amount of pressure is applied so as to snap the latching means on the first layer past those of the second layer. Due to the deformable nature of the film, and because at least one of the sidewalls of each protrusion has been removed in a previous preparation step, the top surfaces of the protrusions can bend slightly under pressure, thereby allowing these surfaces to slide past each other. As they do so, a portion of the lateral edge of each top surface of each protrusion on a first film layer becomes partially located in an aperture of a corresponding adjacent protrusion on a second film layer, thus retaining the protrusions in an interlocked configuration. The protrusions on each film layer are located such that the amount of space between adjacent top surfaces of the protrusions of one layer is slightly less than the width of the top surfaces of the other layer. Once the respective top surfaces have passed one another, they then snap back into their previous conformation due to the open space provided to each lateral edge by the apertures. The top surfaces are locked in position such that one is above the other, and each is resting on the planar film surface located between each protrusion. The strength of the lock (and correspondingly of the snap) will be a function of numerous factors, as explained in further detail below. Depending on the end use application of the film structure, the join between the two film layers can be enhanced, for example, by one or more of various bonding methods, although for some applications this may or may not desirable as such bonding will minimize or eliminate any interlayer movement; bonding can be performed at all or only some of the connection points between the two layers.

Depending on end use requirements, the profiled and slit film layers used in the assembly of the film structures of the invention can be formed from a variety of materials, such as thermoplastics, thermosets, or metals as noted above. The films themselves may be formed in any width as would be practical having regard to existing manufacturing facilities and the intended end use, but widths of from about 0.1 m to about 1.0 m would be satisfactory for use in the assembly of industrial textiles such as would be used for filtration or conveyance in industrial processes. The openness, or permeability of the assembly can be easily adjusted according to need by reducing the overall density of the protrusions, or their uniform height in relation to the land areas between each. The film surfaces can be micro-profiled to impart a surface roughness or texture, or they may remain smooth, depending on need. The film structures of the invention can be assembled in any desired manner, provided that the individual layers are mutually compatible. For example, when used in an industrial textile having a length much greater than its width, the individual profiled and slit films could be oriented in the intended machine or cross-machine direction, depending on end use requirements. One layer of film may be offset from the second film layer with which it is assembled in the manner described in WO 2011/069259 to Manninen, such that one layer partially overlaps the second layer to which it is adjacent. It is also possible to integrate a seaming component into the assembled film structure which is integral to the assembly and formed from the same materials. In lieu of bonding by chemical or energy means, the film layers after assembly may also be secured together by insertion of monofilament-like strands which pass across the joined film structure through the mated apertures of the protrusions, also as described by in WO 2011/069259 to Manninen.

BRIEF DESCRIPTION OF THE FIGURES

FIG. 8b is an enlarged view of a portion of FIG. 8a;

DETAILED DESCRIPTION OF THE FIGURES

Figure 1:
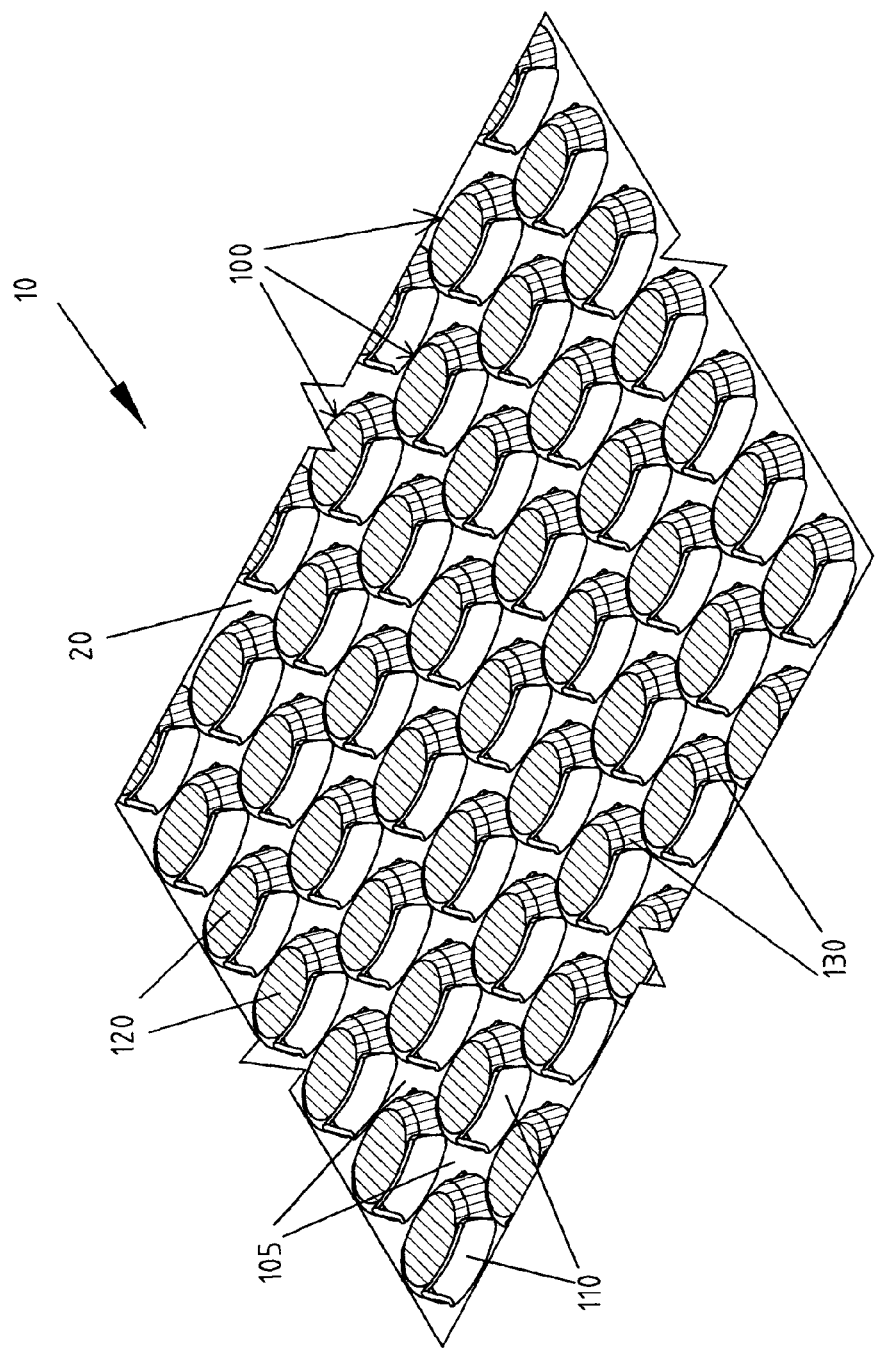
FIG. 1 is a perspective view of a profiled and slit film in an embodiment of the invention.

FIG. 1 is a perspective view of a portion of a profiled and slit film precursor 10, according to an embodiment of the invention and prior to assembly with a second similarly profiled slit film precursor in an embodiment of the invention, as will be explained in detail below. Film precursor 10 is comprised of a generally planar thermoplastic film stock or sheet of a formable metal material 20, which has been profiled in a thermoforming process to impart a plurality of regularly arranged protrusions 100 between which are located planar regions 105. As noted above, film precursor 10 may also be comprised of a thermoset plastic, or a formable metal material; for simplicity in the discussion that follows, the terms "film" and "sheet" will be considered synonymous and the term "film" will be taken as meaning either plastic films or formable metals available in roll or sheet form. In this embodiment, protrusions 100 each have a generally frustoconical shape including an elliptical base and planar top surface 120 as discussed in greater detail below, and are arranged in a regular array of columns and rows. Sidewalls 112 (see FIG. 9) have been slit between end walls 130 so that each protrusion 100 comprises at least one aperture 110, which allows fluid flow through film precursor 10. As discussed further below, two compatible layers of film precursor 10 can be combined by aligning the protrusions of each layer between the protrusions of the other layer such that planar top surfaces 120 of one layer contact planar regions 105 of the other layer.

Figure 2:
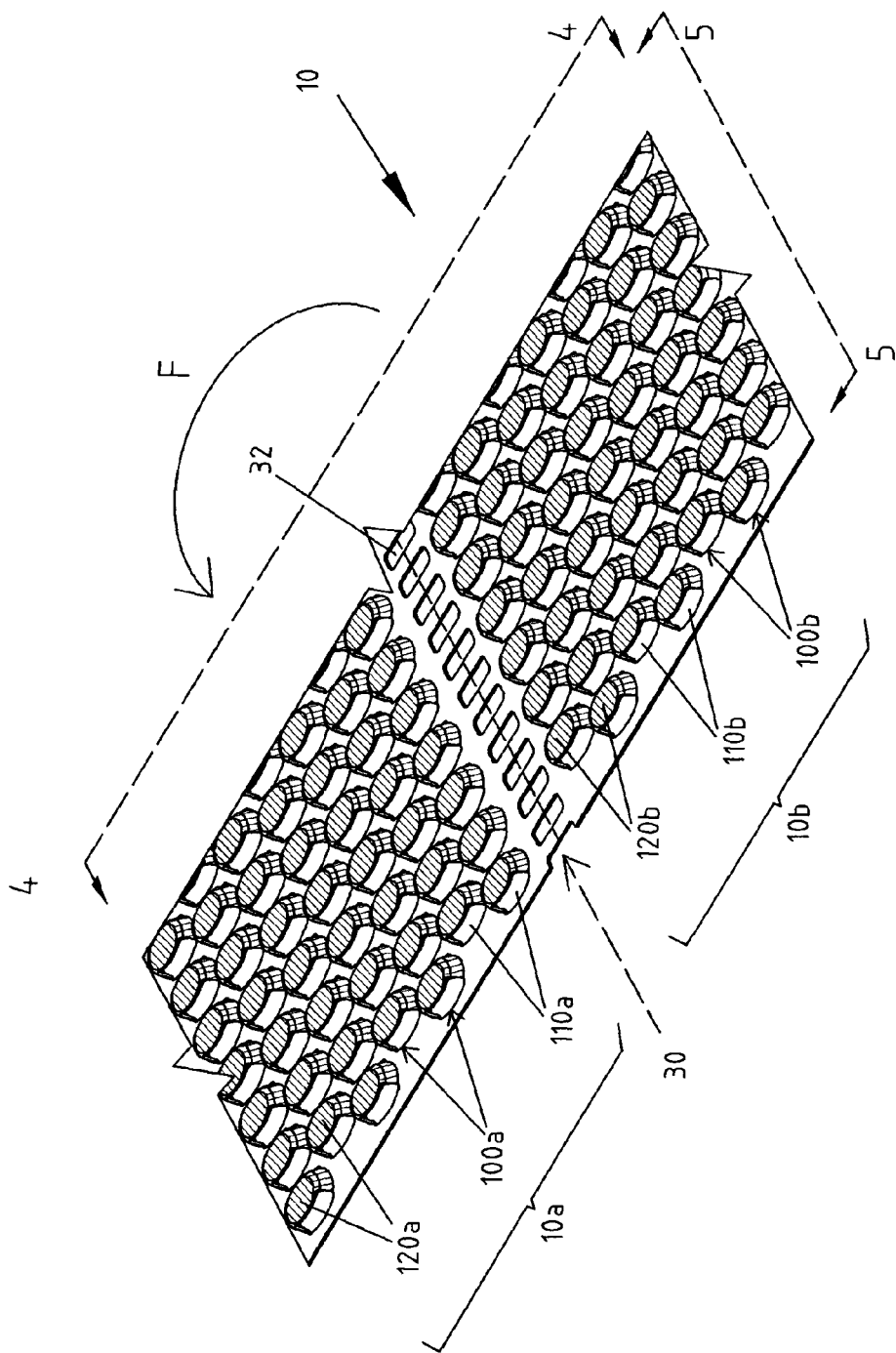
FIG. 2 is a perspective view of an intended seam region of a nonwoven industrial textile in an embodiment of the invention.

FIG. 2 is a perspective view of a portion of profiled and slit film precursor 10 according to a version of the embodiment of FIG. 1, in which the film has been provided with seam region 30. Protrusions 100a, 100b are constructed as in FIG. 1, respectively having planar top surfaces 120a, 120b, and apertures 110a, 110b. Seam region 30 includes a plurality of land areas separated by seam apertures 32. When film precursor 10 is folded along the centre line of seam region 30 as indicated by arrow F, the land areas will form seam loops 31 (see FIG. 3).

As shown, film precursor 10 has two body regions 10a and 10b, separated by seam region 30; both body regions 10a, 10b are essentially identical with regards to the height, width and separation of protrusions 100a and 100b. The rest of the film structure away from seam region 30 would be profiled in the same manner as body regions 10a and 10b. Protrusions 100a and 100b are located so that when film precursor 10 is folded in direction F at seam region 30, protrusions 100a can be aligned between protrusions 100b to provide a two layer film, as further shown in FIGS. 3 to 6.

When folded or assembled in the manner described, protrusions 100 are oriented towards the interior of the resulting two layer film structure, such that their planar top surfaces 120 are in contact with planar regions 105. This creates a plurality of openings on the outer surfaces of the film structure which will face the product and machine surfaces respectively in the operating environment in which an industrial textile comprising multiple units of the assembled film structure is used.

Figure 3:
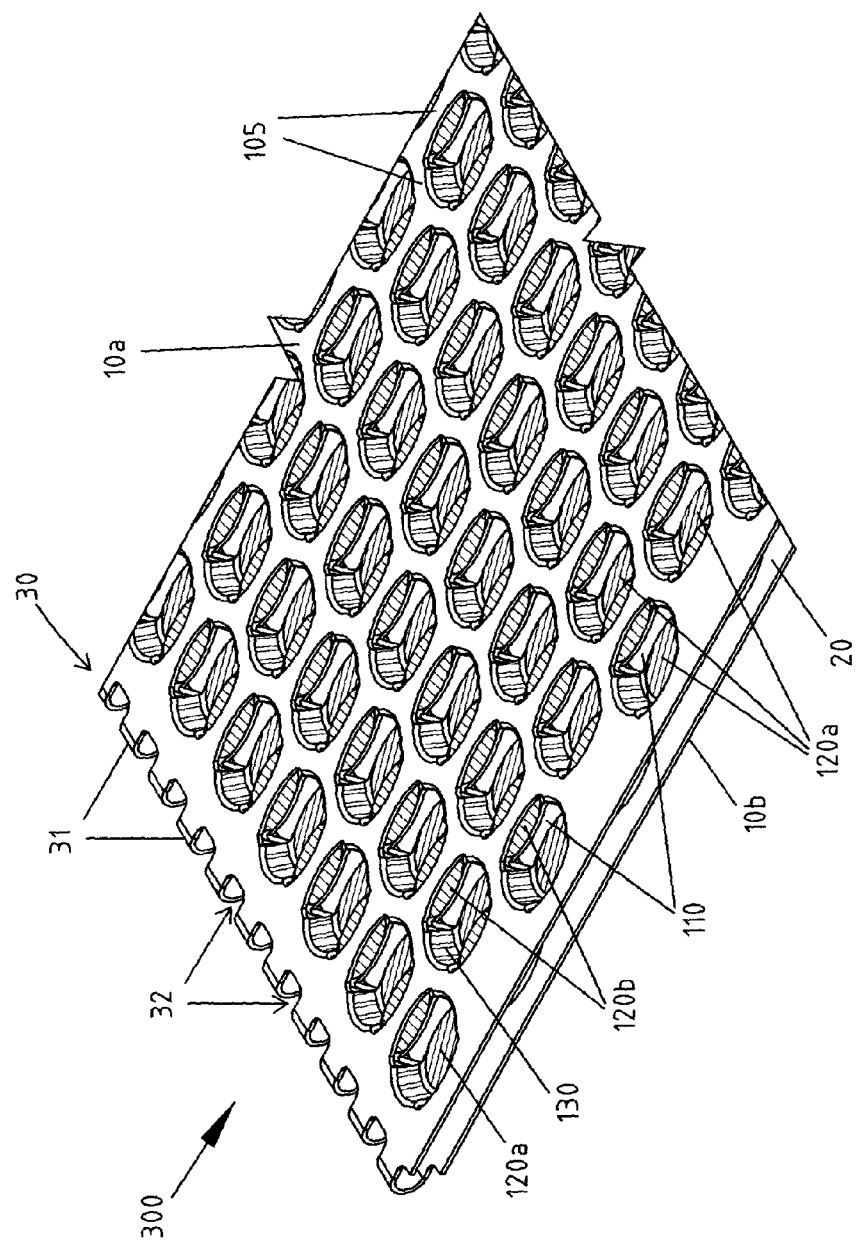
FIG. 3 is a perspective view of the seam region of FIG. 2 after folding of the textile.

FIG. 3 is a perspective view of a portion of assembled film structure 300 prepared from film precursor 10 shown in FIG. 2 and illustrating the relative appearance of the planar tops 120 and apertures 110 after folding film precursor 10 at seam region 30 in the manner shown, so that the opposite surface to that shown in FIG. 2 is outwardly exposed. As can be seen in FIG. 3, the exposed exterior surface of assembled film structure 300 formed by folding body regions 10a and 10b at seam region 30 in the manner described is comprised of a plurality of pockets or depressions formed by the interior surfaces of protrusions 100 (see FIG. 2) and include a bottom surface formed by planar tops 120a, 120b which are attached to end walls 130 and separated by apertures 110. This view clearly shows the means by which body regions 10a and 10b of precursor film 10 are joined to form a self locking industrial textile of the present invention.

Figure 6:
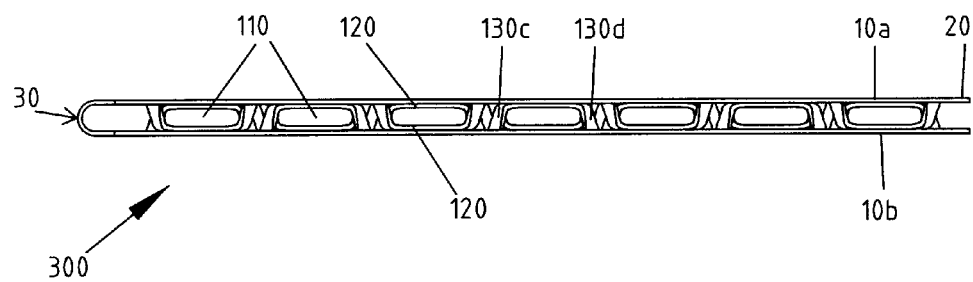
FIG. 6 is a side view of the industrial textile of FIG. 2 after folding of the textile.

During folding and assembly in the manner shown in more detail in FIG. 6, planar tops 120a of protrusions 100a in body region 10a are located in alignment with and in between the corresponding protrusions in body region 10b. A small amount of pressure is applied so as to snap the lateral edges of planar top surfaces 120a of body region 10a into the corresponding but smaller available space between top surfaces 120b of body region 10b. Due to the deformable nature of film precursor 10, and because the sidewalls 112 of each protrusion have been removed in a previous preparation step, the lateral edges of top surfaces 120 of the protrusions 100 in each of body regions 10a and 10b can bend slightly to allow these top surfaces 120 to slip past one another. Once past, the top surfaces 120 snap back into their previous planar conformation due to the open space provided on each side by apertures 110 and are now secured in position such that one is above the other, and each is resting on planar regions 105 of the film such as spaces 140, 145 (see FIG. 7), located between each protrusion. This securing action is illustrated in greater detail in relation to FIGS. 14 and 15 as discussed below.

The strength of the securing action (and conversely of the snap) will be a function of various factors, including the film's resistance to deformation (e.g. Young's modulus), the amount of overlap that exists between the locking features (i.e. planar top surfaces 120 as they fit into apertures 110), their geometry, the pitch or spacing between adjacent protrusions 100, and film thickness; other factors may have relevance as well.

At this point, body regions 10a and 10b, now comprising two layers of assembled film structure 300 of the intended textile, although secured in relation to forces in the X and Y directions in the plane of the textile, may still be separated by pulling them apart by opposing forces in a Z direction, perpendicular to that plane. As the two-layer textiles of the invention will not generally be subjected to such forces in the direction which would result in separation, this will not present any problem. However, if further securing is considered advantageous for a specific end use, any unwanted relative movement between the layers can be prevented or minimized, by bonding top surfaces 120 of protrusions 100 of each layer to planar regions 105 in the opposing layer, at all or selected ones of the connection points between the two layers.

Figure 4:
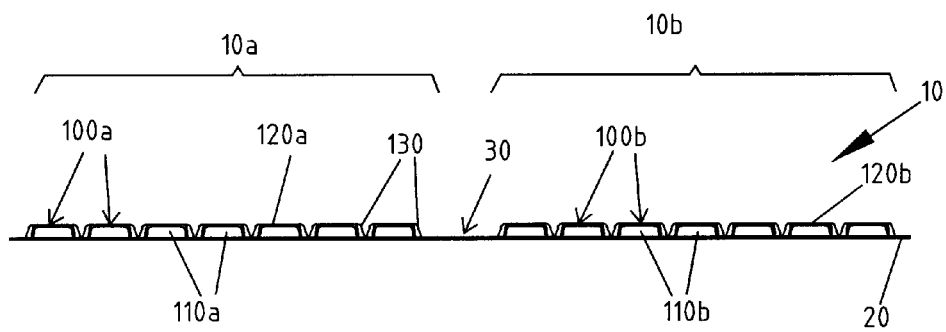
FIG. 4 is a sectional side view of the film of FIG. 2, taken along the line 4-4.

FIG. 4 is a side view of film precursor 10 of FIG. 2 and taken along line 4-4 in that figure, indicating seam region 30 and body regions 10a and 10b. When folded at seam region 30, planar top surfaces 120a of protrusions 100a of body region 10a will nest into widthwise spaces 145 (see FIG. 7) between protrusions 100b located on body region 10b, as will be discussed in detail below. FIG. 4 also shows apertures 110a and 110b in protrusions 100a and 100b respectively, as well as end walls 130 of each of protrusions 100a, 100b; end walls 130 take the form of a shell and provide a measure of compression resistance to the assembled structure, thus ensuring that apertures 110a, 111b remain at least partially open when the assembled textile is in use to allow for passage of fluid or other materials.

Figure 5:
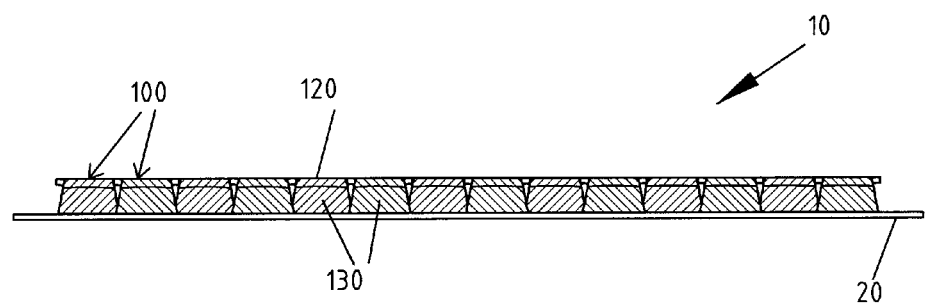
FIG. 5 is a sectional lengthwise view of the film of FIG. 2, taken along the line 5-5.

FIG. 5 is a lengthwise view of film precursor 10 shown in FIG. 2 and taken along the line 5-5 in that Figure. In FIG. 5, it can been seen that planar top surfaces 120 of protrusions 100 form a level plane rising out of film stock 20, top surfaces 120 being supported in this manner by curved end walls 130 remaining for each protrusion following removal of a portion of sidewalls 112 (see FIG. 8) to form apertures 110.

FIG. 6 is a side view of assembled film structure 300 of FIG. 3 following a folding process of film precursor 10 shown in FIG. 2 along seam region 30 in the direction indicated by arrow F so as to bring opposing body regions 10a and 10b together. As can be seen, the generally planar tops 120 of each protrusion from each of body regions 10a and 10b rest in contact with planar regions 105 (see FIG. 1) on the opposing surface, and apertures 110 are in alignment to form open channels through the assembled structure; these channels provide a void volume to the assembled structure allowing for passage of fluid. These channels can be made larger or smaller according to need by selecting an appropriate height of end walls 130 of each protrusion 100. End walls 130c and 130d of each protrusion 100 are aligned across the width of assembled film structure 300 to provide support and resist compressive loading.

Figure 7:
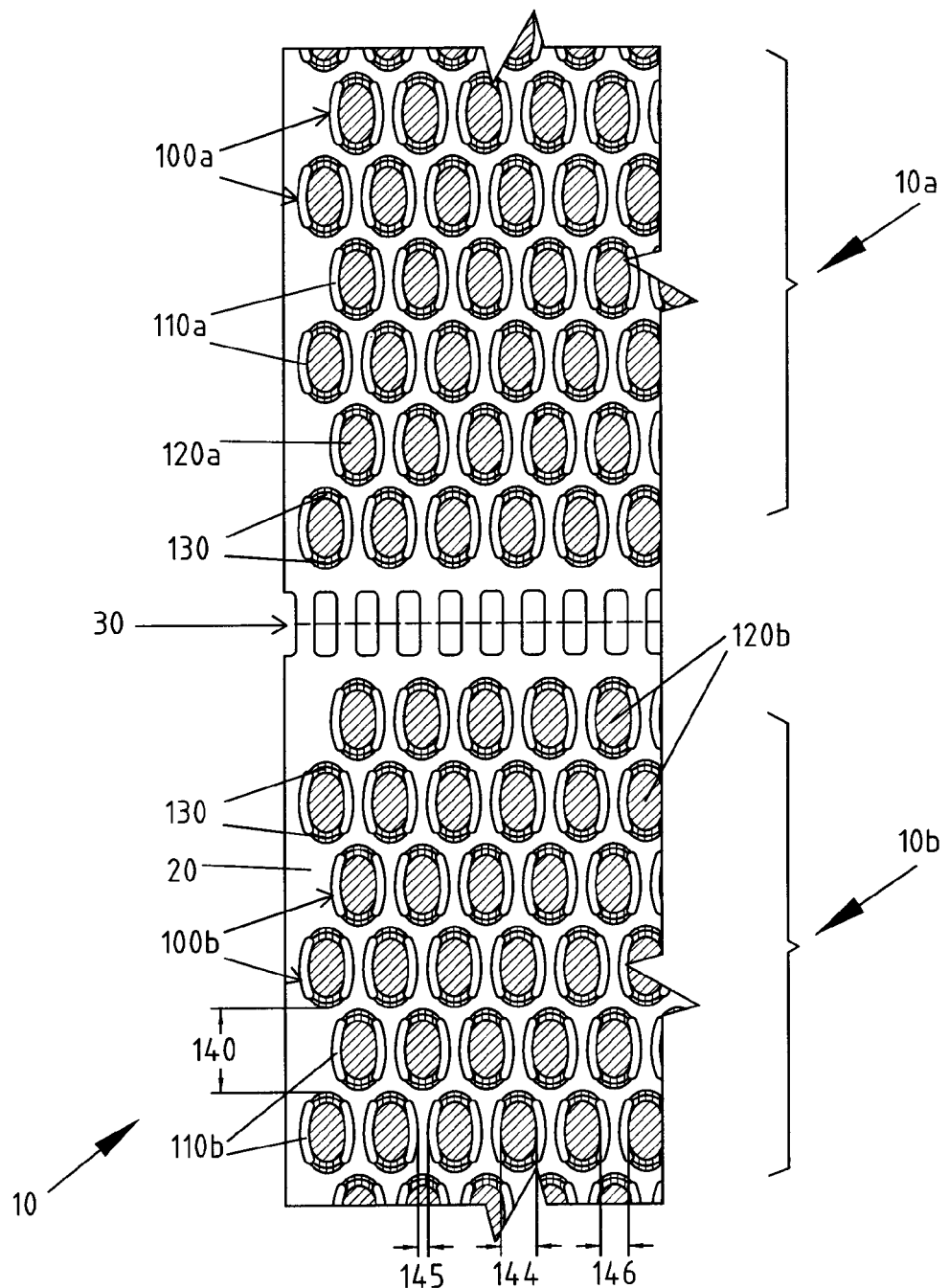
FIG. 7 is a top view of the film of FIG. 2.

FIG. 7 is a top view of a portion of a first surface of film precursor 10 shown in FIG. 2, and showing top surfaces 120a and 120b of protrusions 100a and 100b on each of opposing body regions 10a, 10b, adjacent to seam region 30 before folding in the manner described. Apertures 110a and 110b formed in each of protrusions 100a and 100b can also be seen on each side of protrusions 100a, 100b, and extending between end walls 130. In this embodiment, as noted in relation to the embodiment shown in FIG. 1, each protrusion has an elliptical base which is shaped during the thermoforming process. As the protrusions are initially formed, each has a frustoconical geometry providing generally rounded sidewalls 112 (see FIG. 9) and end walls 130c, 130d. During subsequent processing, a portion of at least one sidewall 112 of each protrusion 100a, 100b is removed such as by a precision laser slitting process forming apertures 110, and leaving behind planar top surfaces 120, supported by end walls 130c, 130d on each protrusion 100. Protrusions 100 are arranged on the surface of film precursor 10, such that lengthwise space 140 and widthwise spaces 145 and 146 between protrusions of one of body regions 10a, 10b will accommodate the corresponding top surfaces 120 of the protrusions 100 from the other of body regions 10a, 10b in a manner allowing top surfaces 120 of protrusions of each of body regions 10a, 10b to snap into apertures 110 of the other of body regions 10a, 10b, such that top surfaces 120 can contact the planar film surface 105 in the area defined by lengthwise space 140 and widthwise space 145. The widthwise separation dimension of spaces 146 of two top surfaces 120 of two adjacent protrusions 100 in the same row is generally preferably about twice as large as the widthwise separation dimension of spaces 145 of their bases and is less than minor axis dimension 144 of planar top surfaces 120 of protrusions 100. This separation dimension of spaces 146 is sufficient to allow adjacent top surfaces 120b to pass between adjacent top surfaces 120a, and subsequently be retained in a secured configuration. In general, separation space 146 between two adjacent top protrusion surfaces is less than minor axis dimension 144 of the planar top surfaces 120 with which they are mated. The latching means which mechanically joins body regions 10a and 10b is thus formed when the lateral edges of top surfaces 120 of protrusions 100 are received by and retained within corresponding apertures 110. Because separation dimension 146 is less than minor axis dimension 144, the protrusions from one layer can be simply and securely interlocked with those of a second, similarly profiled layer.

Figure 8A:
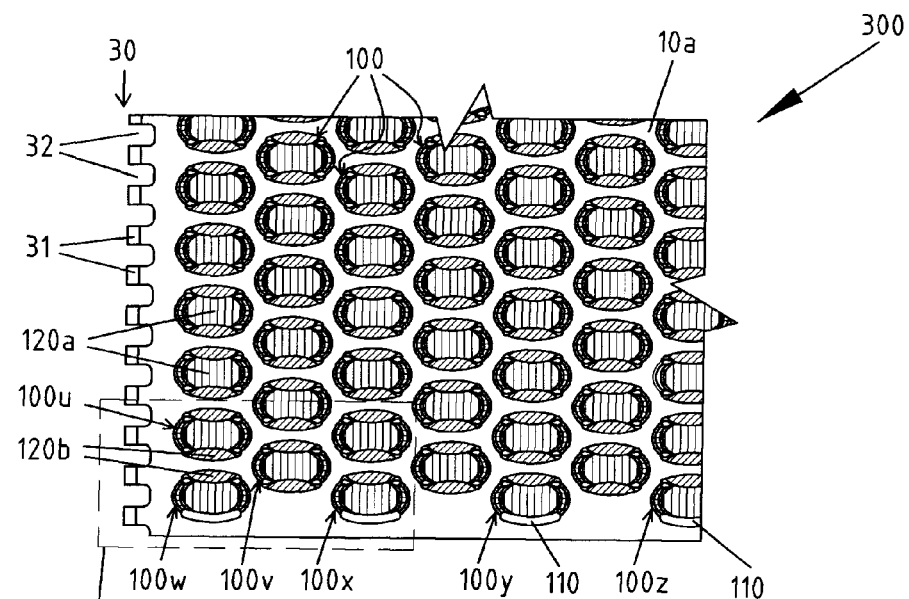
FIG. 8a is a top view of the industrial textile of FIG. 2 after folding as shown in FIG. 3.
Figure 8B:
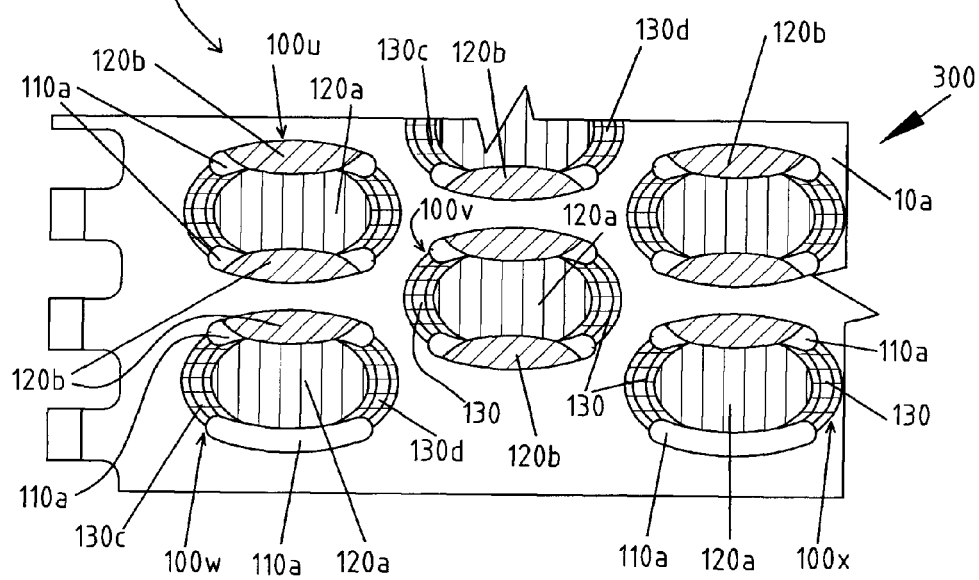

FIGS. 8a and 8b show an exterior surface of an assembled film structure 300 such as it would appear as used, for example, in an industrial textile.

FIG. 8a is a top view of a portion of assembled film structure 300 of FIGS. 3 and 6 as formed from precursor 10 shown in FIGS. 2, 4, 5 and 7, showing body region 10a, and illustrating in greater detail the relative positioning of planar top surfaces 120 of protrusions 100 in relation to corresponding apertures 110 in the two film layers which have been assembled in the manner described above in relation to FIG. 3. The lower part of the figure shows one of the lateral edges of the assembled textile, and shows four exemplary partially assembled protrusions 100 of body region 10a, which are identified as 100w, 100x, 100y and 100z, and two fully assembled protrusions identified as 100u and 100v.

Protrusion 100w, for example, shows protrusion top surface 120a, as well as a portion of protrusion top surface 120b from one of protrusions 100b in body region 10b. This protrusion top surface 120b is at the same time locked into one aperture 110a of protrusion 100w and one aperture 110a of adjacent protrusion 100u.

This area is shown in greater detail in the enlargement in FIG. 8b. Exemplary protrusion 100w includes two shell-shaped end walls 130, identified as 130c and 130d, which are vertically continuous and extend to planar top surface 120a. End walls 130c and 130d are preferably shell shaped in the manner described in CA 2,779,131 to Manninen to provide support for planar surface 120a, enabling it to resist compressive force applied to the completed textile. Exemplary protrusions 100u, 100v of body region 10a are each fully interlocked with top surfaces 120b from body region 10b located in apertures 110a.

It will be noted that the lower of the two apertures 110a of each of protrusions 100w, 100x, 100y, 100z, which occur at a lateral edge of the assembled film precursor, do not include a portion of a planar top surface 120b from a corresponding protrusion 100b of body region 10b. The cutting process can be selected so that apertures 110 are not formed in protrusions 100 adjacent to lateral edges of film precursor 10, or if apertures are formed, they can be sealed, if required, in an appropriate manner during a finishing step.

Figure 9:
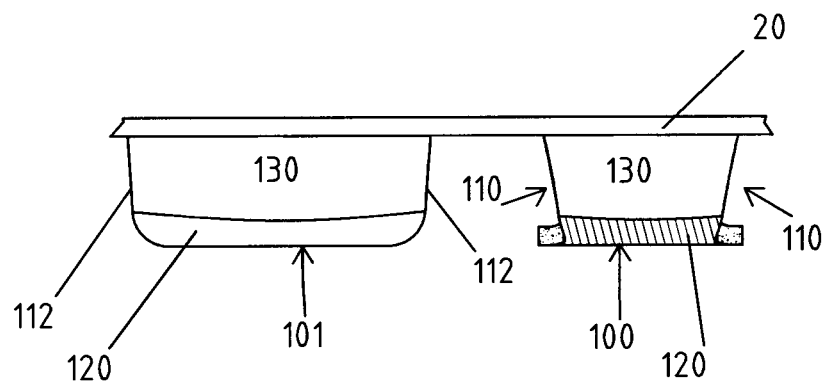
FIG. 9 is a side view of two protrusions in film in an embodiment of the invention showing the slitting process.

FIG. 9 is a side view of two protrusions such as would be provided to a planar film 20 for use in the industrial textiles according to the invention. Protrusion 101 is shown as formed in thermoplastic film 20 in a thermoforming process and before cutting sidewalls 112 to form apertures 110 through the protrusion. Protrusion 100, originally having the same configuration as protrusion 101, is shown following the cutting away of portions of each of sidewalls 112, while retaining end walls 130 and planar top surface 120.

Figure 10:
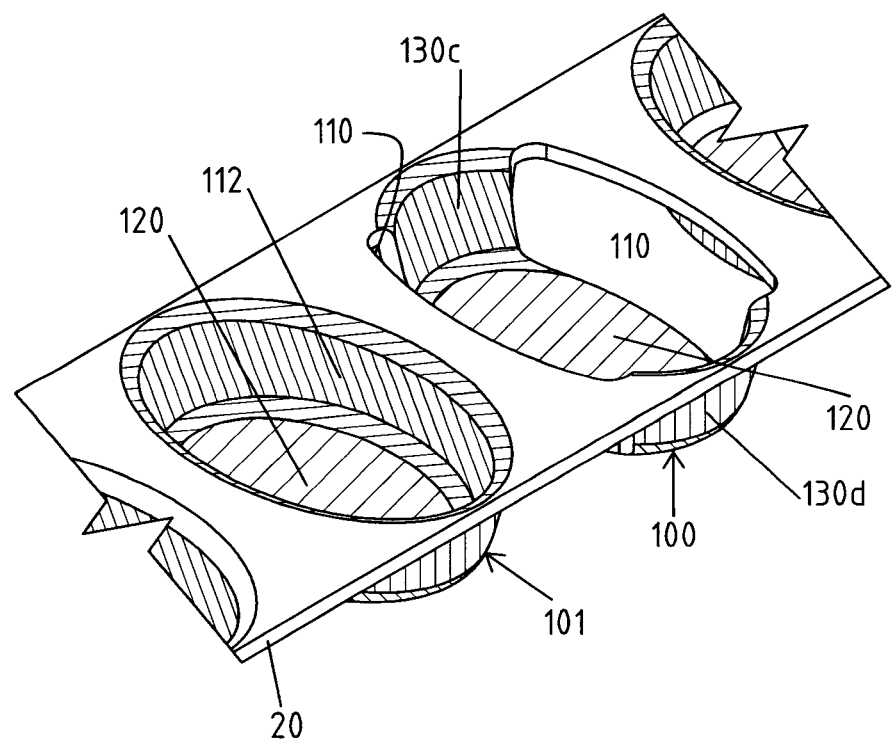
FIG. 10 is a first perspective view of the protrusions shown in FIG. 9.

FIG. 10 is a first perspective view of protrusions 100 and 101 as formed in a thermoforming process in film sheet 20, as shown in FIG. 9 and as seen from above one surface as if looking into the interior of the protrusions. As can be seen, protrusion 101, before cutting, has a generally bowl-like shape including sidewalls 112 which are continuous with end walls 130 around the outer perimeter of the protrusion and extending to top planar surface 120. Protrusion 100 shows the same protrusion as 101 after cutting away a portion of each sidewall 112 to provide apertures 110 on both sides of protrusion 100, and defining end walls 130c and 130d.

Figure 11:
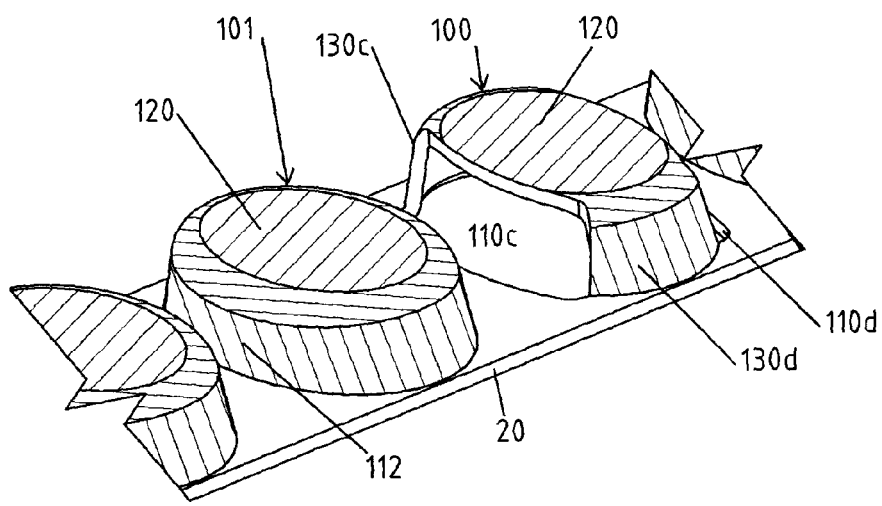
FIG. 11 is a second perspective view of the protrusions shown in FIG. 9.

FIG. 11 is a second perspective view of protrusions 100 and 101 as presented in FIGS. 9 and 10, but seen from their top surfaces 120. It will be apparent that apertures 110c and 110d extend to the interior of protrusion 100 while end walls 130c and 130d serve to support planar top surface 120 in the manner previously discussed.

Figure 12:
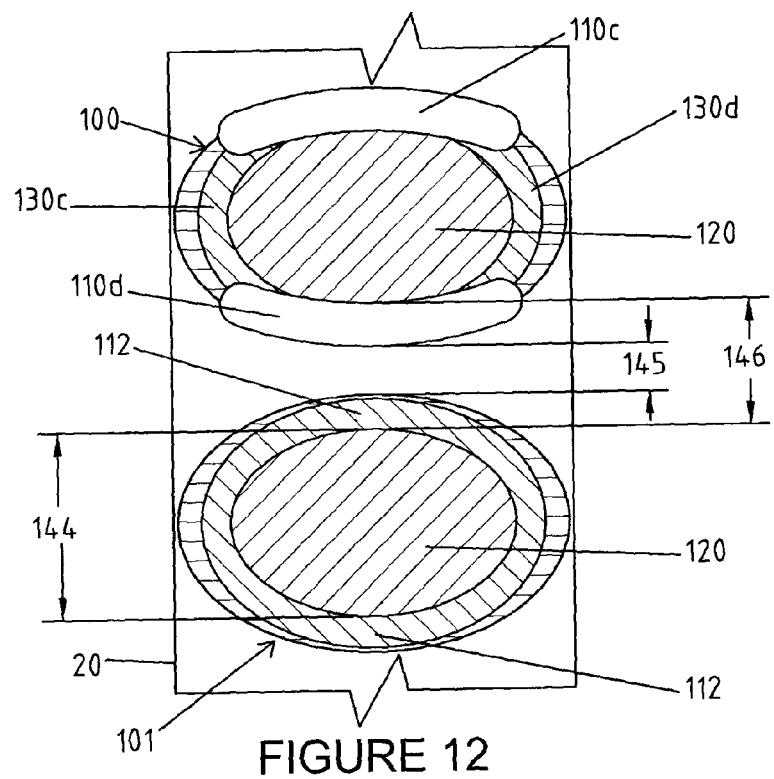
FIG. 12 is a top view of the protrusions shown in FIG. 9.
Figure 13:
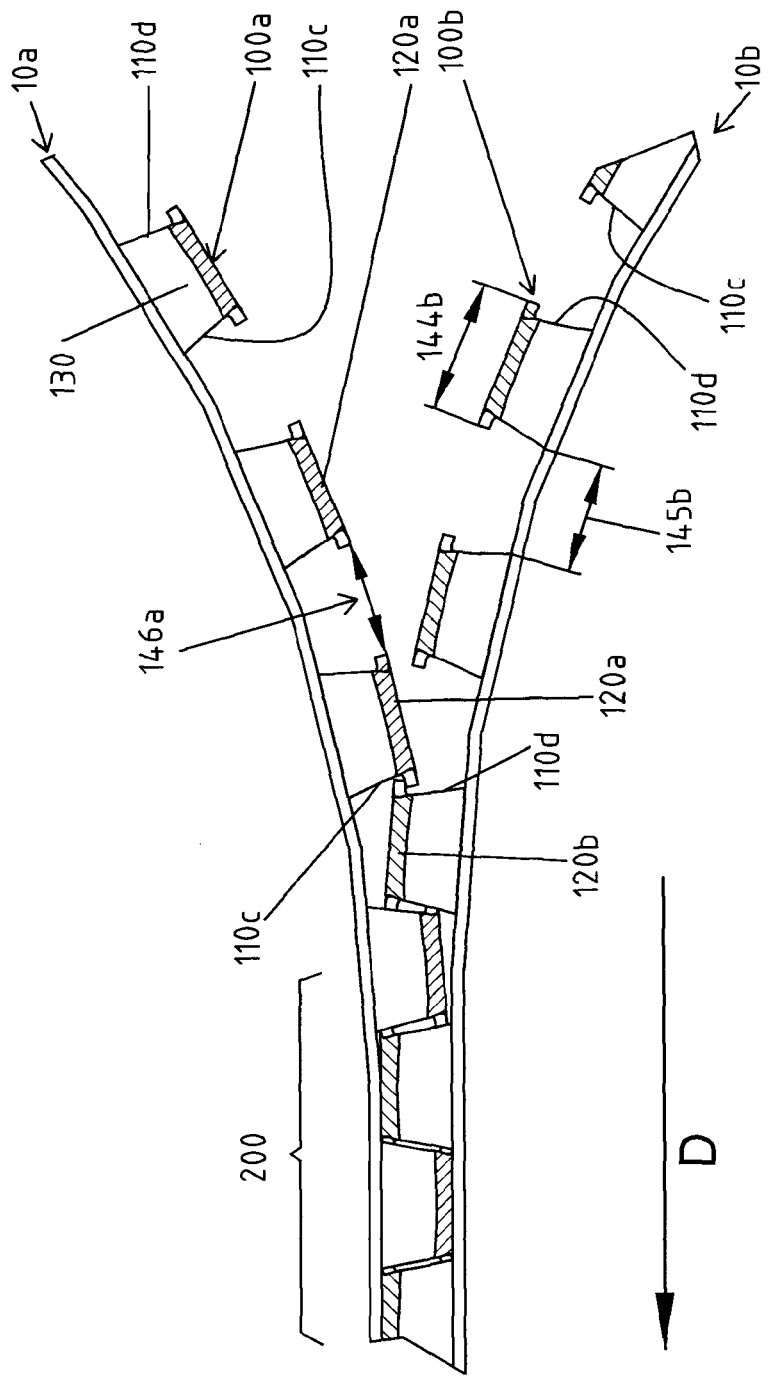
FIG. 13 is a side view of two layers of film in an embodiment of the invention, showing the interlocking process.
Figure 14:
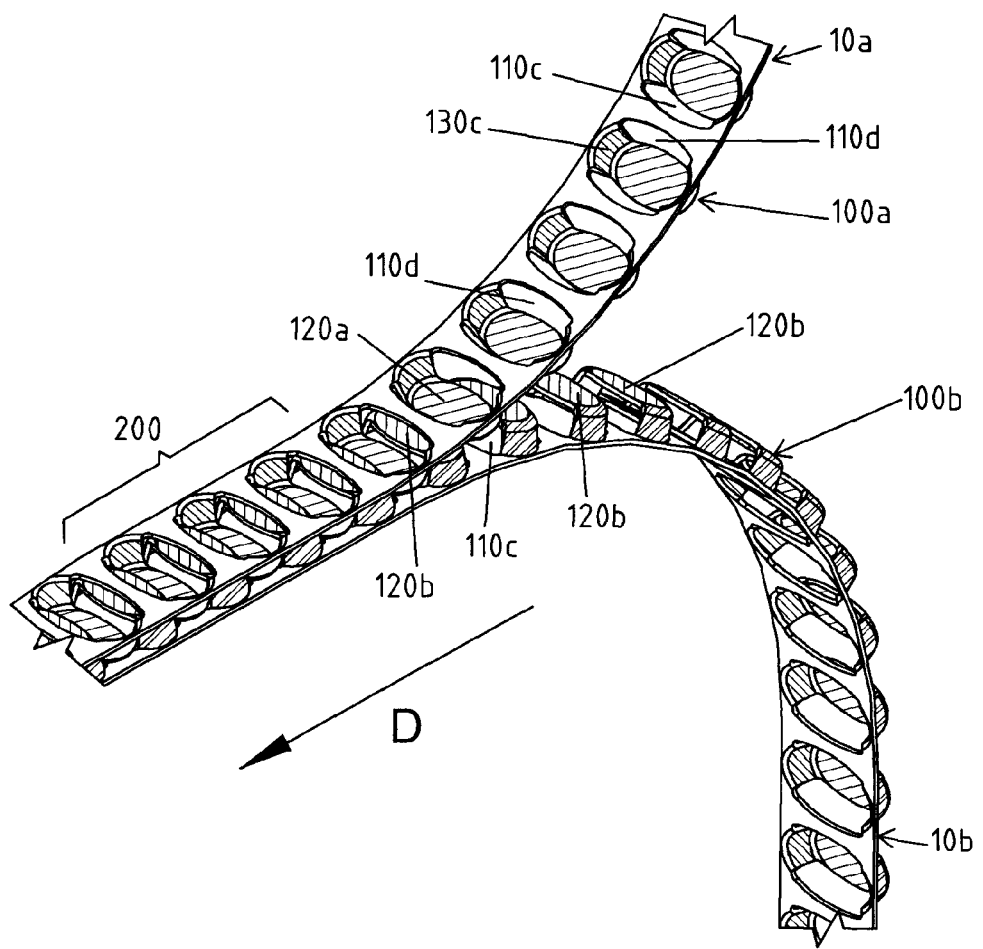
FIG. 14 is a perspective view of the two layers of film shown in FIG. 13.
Figure 15:
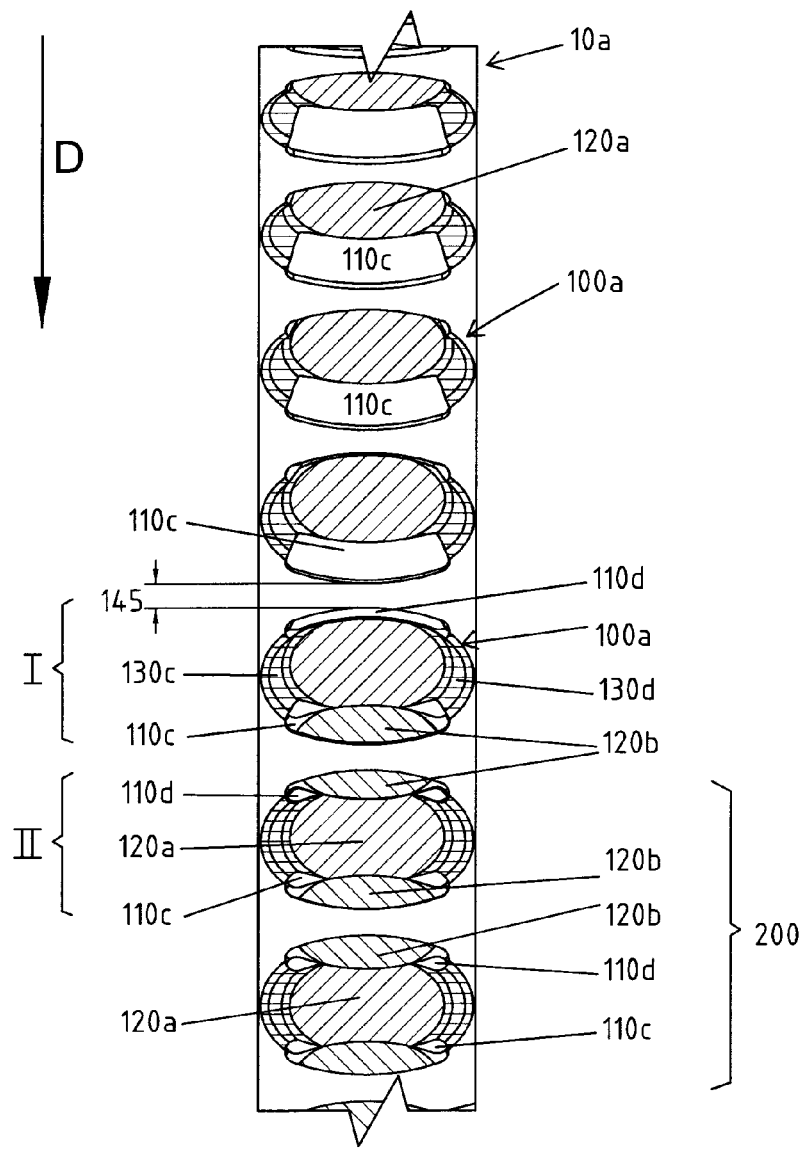
FIG. 15 is a top view of the two layers of film shown in FIG. 13.

FIG. 12 is a top view of protrusions 100 and 101 shown in FIGS. 9 to 11, showing protrusion 101 before cutting away a portion of side walls 112, and adjacent protrusion 100 after cutting away side walls 112 to define apertures 110c and 110d on each side. As discussed above in relation to FIG. 7, the base of protrusion 100 is laterally spaced from protrusion 101 by a space 145, while planar top surfaces 120 of the protrusions having minor axis dimension 144 are separated by spaces 146 which are larger than spaces 145 but smaller than the corresponding minor axis dimension 144 of planar top surfaces 120. The dimension of spaces 146, in addition to the open space provided by e.g. apertures 110c and 110d, is sufficient to allow planar top surfaces 120 of an opposing profiled film to be located between cut protrusions 100 when two similarly profiled film layers are snapped together. FIGS. 13 to 15 show this process in greater detail.

FIG. 13 is a side view of two similarly slit and profiled film body regions 10a and 10b as they are brought together into an interlocked configuration, showing one row of protrusions 100a and 100b at and before interlock area 200. During assembly, protrusions 100a in profiled film body region 10a are brought into alignment with protrusions 100b in similarly profiled film body region 10b; both film body regions are passed around a curved surface such as a roll so as to open and maximize the lateral spaces 145b, 146a between adjacent protrusions 100a and 100b. Each of protrusions 100, of which 100a and 100b are exemplary, has a first aperture 110c and a second aperture 110d. As the two body regions 10a and 10b are brought together in a nip, a first lateral edge of first planar top surface such as 120a is hooked under a corresponding second lateral edge of second planar surface 120b at second aperture 110d, because its width, for example 144b in direction of movement D is sufficient to allow it to pass through space 146a in a tight fit; as body regions 10a and 10b proceed in direction D into the nip, pressure applied by the rolls (not shown) pushes second lateral edge of first planar surface 120a down such that it is latched under first lateral edge of second planar surface 120b at first aperture 110c. The two body regions are then locked together as they enter interlock area 200. This occurs across the entire width of body regions 10a and 10b so as to join them together into a single assembled film structure such as is shown in FIGS. 3, 6 and 8. Body regions 10a and 10b are retained in the desired locked configuration because the width such as 144b of planar top surfaces 120a and 120b is greater than the width of the spaces such as 146a between the adjacent top surfaces.

FIG. 14 is a perspective view of the interlocking process shown in side view in FIG. 13. To simplify understanding, the figure shows a single set of protrusions 100a and 100b on each of two film body regions 10a and 10b as they proceed in direction D. However, it will be understood that each body region will comprise a plurality of protrusions 100 in rows across its width, i.e. perpendicular to direction D, and the protrusions 100a of each row in body region 10a will interlock simultaneously with the protrusions 100b of the corresponding row in body region 10b. As can be seen, as body regions 10a and 10b proceed into interlock area 200, the leading edge of planar top surface 120a becomes located under the trailing edge of corresponding surface 120b as it snaps into second apertures 110d. As the layers enter the nip in interlock area 200, the trailing edge of surface 120a is snapped into first aperture 110c and beneath surface 120b, thus locking the two protrusions, and the remainder of the row of protrusions (not shown) of which it is a component, together.

FIG. 15 is a top view of film body region 10a in the interlocking process with film body region 10b illustrated in FIGS. 13 and 14, and showing the region I, indicating where the protrusions of each layer start to interlock with the protrusions of the other layer; and region II, where the protrusions are fully interlocked. In the manner described in relation to FIGS. 13 and 14, as body regions 10a and 10b (10b not shown) proceed in direction D, trailing edge of surface 120b of body region 10b enters first aperture 110c of protrusion 100a, and thereafter leading edge of the next following surface 120b enters second aperture 110d of protrusion 100a. Trailing edge of that surface 120b will then enter first aperture 110c of the next following protrusion 100a.

As noted above, the curvature imparted to the film body regions 10a and 10b as they pass around suitable rolls (not shown) to enter the nip area spreads apart the protrusions 100 from each other at their top surfaces 120, and effectively enlarges the distance 146 between adjacent protrusions (see FIG. 13) sufficiently to allow the planar top surfaces such as 120a to pass by and become hooked beneath surfaces 120b where they are retained in position following assembly.

Figure 16:
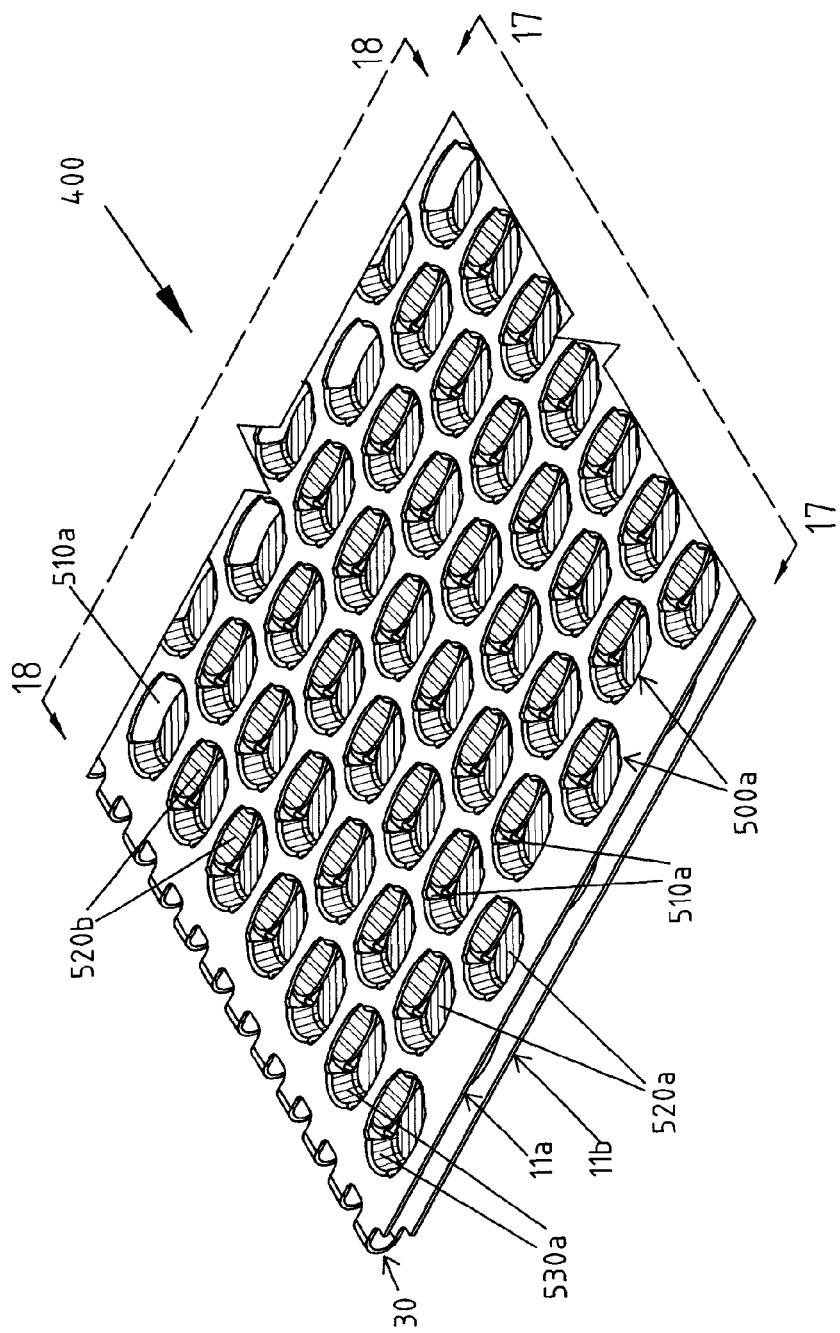
FIG. 16 is a perspective view of an assembled two layer film in a further embodiment of the invention.

FIG. 16 is a perspective view of a portion of an assembled film structure 400 in an embodiment of the invention. Film structure 400 includes two interlocked film body regions 11a and 11b, in which protrusions 500a on body region 11a are greater in height than protrusions 500b located on body region 11b, but are dimensioned so that body regions 11a and 11b are mutually compatible. In the same manner as in the embodiments shown in FIGS. 1 to 15, protrusions 500a of body region 11a, having planar top surfaces 520a, end walls 530c, 530d (see FIG. 18) and apertures 510a, are interlocked with protrusions 500b of body region 11b, having planar top surfaces 520b, end walls 531c, 531d (see FIG. 18) and apertures 510b.

Figure 17:
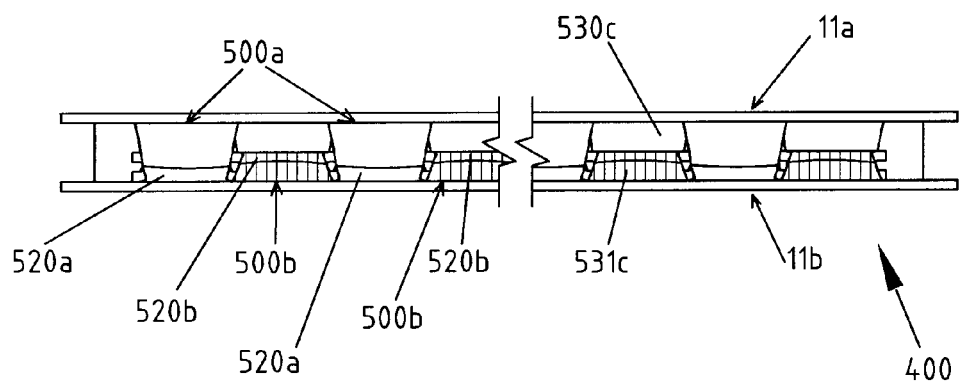
FIG. 17 is a sectional side view of the film of FIG. 16, taken along the line 17-17.

FIG. 17 is a sectional side view of assembled film structure 400 shown in FIG. 16, taken along the line 17-17 in that figure. It can be seen that protrusions 500a on body region 11a are greater in height than protrusions 500b located on body region 11b. The protrusions 500a, 500b of body regions 11a, 11b are interlocked in the same manner as in the embodiments shown in FIGS. 1 to 15. The height difference between protrusions 500a and 500b is shown in this figure and in FIG. 18 as being approximately a factor of two, but other differences can be selected according to the intended end use and required properties for the film structure.

Figure 18:
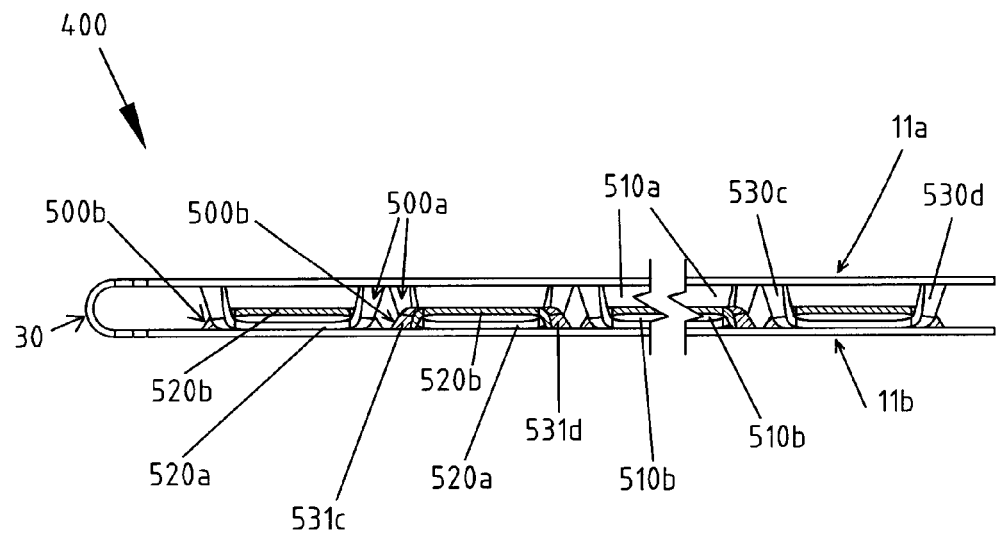
FIG. 18 is a sectional side view of the film of FIG. 16, taken along the line 18-18.

FIG. 18 is a sectional side view of a portion of assembled film structure 400 shown in FIG. 16 and taken along the line 18-18 in that Figure. The illustration shows the relative position of protrusions 500a and 500b, apertures 510a and 510b formed by the interlocking of protrusions 500a and 500b, the relative location of planar top surfaces 520b in assembled film structure 400, and their supporting end walls 530c, 530d and 531c, 531d. It can be seen that apertures 510b have a depth which is approximately half that of apertures 510a, thus reducing the amount of movement of planar surface 520b in comparison with that available for surfaces 120a, 120b in the embodiment of FIG. 2, as well as the permeability of assembled film structure 400.

The embodiment shown in FIGS. 16 to 18 would exhibit comparatively less interlayer movement of the two body regions 11a and 11b when compared to the embodiments in which the height of all of the protrusions in both layers is the same. A further feature of this embodiment is that the structure places more of the mass of the film preferentially towards the side having the shorter protrusions such as are in body region 11b. Nonwoven industrial textiles constructed in accordance with this second embodiment will also have lower air permeability but, due to the size of the relatively shorter protrusions 500b they will not be as resistant to compression as textiles which include two layers of protrusions all of which are of the same height.

The film structures and self locking nonwoven industrial textiles of the present invention can be formed from any suitable film or sheet forming materials such as are commonly used in the manufacture of industrial textiles; however, thermoplastics such as polyesters, polyamides, polyimides and the like are particularly suitable for these applications. Polyethylene terephthalate (PET) and its copolymers, with or without hydrolysis stabilization, depending on the intended end use, is generally preferred as this material is particularly amenable to the various process steps through which the film must proceed in order to form and assemble the textiles. The PET films may be coextruded with a laser weld enabled component as described by Manninen in CA 2,758,622, or they may be bi-axially oriented and hydrolysis stabilized in the manner as described by Manninen in CA 2,778,513.

The film structures and textiles of the invention can also be constructed of other materials, including thermoset polymers, or formable metal grades such as aluminum alloy, brass, cold rolled steel, copper, galvanized steel, high strength low alloy steel, hot rolled steel, steel alloy, stainless steel and zinc.

The protrusions formed in the film by means of a profiling process will be generally shaped as described by Manninen in CA 2,779,131, in particular as in FIG. 14 of that application, but with one significant difference in the slitting configuration. As described in the '131 document, the apertures or slits are generally linearly extending, parallel, and extend from the forward to the rearward walls of each protrusion. The protrusions themselves are frustoconical with elliptical bases and top planar surfaces. In the present invention, the slitting has been modified so as to generally conform to the curvature of the side walls of each protrusion so as to more effectively facilitate the interlocking of the two similarly profiled film layers. Because the protrusions are regularly arranged, both they and their apertures may be sized so as to accept one or more polymeric monofilaments which can be inserted across the width of two layers of the joined and profiled slit film; in such a configuration, the monofilaments will serve to prevent collapse of the two layer structure under excessive compressive loading, and could also be used to augment the interconnection of the film layers.

In the embodiments of the invention illustrated in the appended figures in which the protrusions provided to each film precursor layer are of the same height, for example in an exemplary film 20 having an original thickness of 0.25 mm, each protrusion as shown has a height above the plane of the film of about 1.5 mm. The overall length of each protrusion at its base is 6.0 mm and its width is 3.7 mm corresponding to major and minor axis radii of 3.0 mm and 1.85 mm respectively. An elliptical aperture 110 conforming with and cut through both sidewalls 112 of such protrusion 100 will remove a portion of the material forming the base, protrusion sidewalls 112 and planar top surface 120 to provide elliptical planar top surface 120 having corresponding length of 4.2 mm and width of about 2.8 mm. As shown, the cross direction (CD) spacing 146 between adjacent top surfaces 120 of each protrusion 100, and between which the surface 120 must be pushed to interlock, or latch, is 2.2 mm. When two sets of similarly dimensioned protrusions 100a, 100b are brought together in alignment in the manner previously described, about 0.3 mm of the lateral edges of each planar top surface 120a of the first set of protrusions 100a will be retained in respective ones of apertures 110b beneath planar top surfaces 120b of the second set of protrusions 100b, thus providing the latching means. Dimensions other than those noted above may prove suitable depending on the end use application of the structure and resulting textile. In the embodiments shown in FIGS. 1 to 15, the pitch spacing of the protrusions in the lengthwise (machine direction) dimension is 6.5 mm and in the CD is 5.0 mm. Pitch spacing (the distance from the centre of one ellipse to the next) may be varied according to the intended end use. Each of top surface 120 and base of the protrusions 100 will preferably include a small radius at their edges to ease film release from the machine surface on which it is formed. In addition, the dimensions of protrusions 100 and associated apertures 110 and planar top surfaces 120 can be adjusted according to need and materials used.

It is also possible to use two film layers each having differing but mutually compatible protrusions and apertures to form a joined film, such as in the manner described by Manninen in CA 2,779,131.

Further, one or both layers of the film may optionally be embossed to impart a surface pattern to them, such as striations, raised dots or ellipses, cross-hatching, or any desired regular or randomly arranged design. The elevation of such pattern would be much less than the height of the protrusions. Such patterns could be used, for example, on a conveying surface of a papermaking fabric, to emboss a paper sheet product, or to enhance the release of contaminants; or on either surface of a structure or textile to increase the frictional or other tactile characteristics of the film surfaces.

Nonwoven industrial textiles formed from the film structures of the present invention are useful in a variety of industrial processes such as conveyance, filtration and separation. They are particularly suitable for use as papermaking fabrics, in particular forming fabrics, through-air drying fabrics and dryer fabrics which are used to form, transport and dry the paper product conveyed through the papermaking machine. For example, the pockets or depressions created on the exterior surfaces of the film structures by the protrusions makes them particularly suitable for use in the manufacture of absorbent products, such as towel and tissue, where it is frequently desirable to provide areas of relative low and high basis weight in the paper sheet. Industrial textiles formed from the self-locking structured films of the invention also find utility in allied continuous process industries, such as nonwovens production, mineral and mining separation processes, as well as various chemical separation processes, all of which presently use woven or perforated film textiles. Because the film structures of the invention can be easily adjusted to vary parameters such as interlock frequency, protrusion size, aperture size, film or sheet material, industrial textiles made therefrom are applicable to a wide variety of uses.

I claim:

1. An industrial textile comprising two layers of a film structure, each film structure comprising a film with:
   (i) an upper surface and a lower surface; and
   (ii) a plurality of protrusions separated by land areas and defining a profile of the upper surface,
   wherein
   (a) each protrusion has a body comprising a top member having opposed first and second lateral edges and is supported by opposed first and second end walls;
   (b) at least one of the lateral edges cooperates with the end walls to define an aperture extending through the film from the upper surface to the lower surface; and
   (c) the top member comprises a coplanar latching means extending over the aperture, wherein when the upper surface of a first layer of the film is brought into contiguous relationship with the upper surface of a second layer of the film, and the protrusions of each of the respective layers are aligned between adjacent protrusions of the other layer, the latching means of the first layer are received and retained within the apertures of the second layer, and the latching means of the second layer are received and retained within the apertures of the first layer.

2. The industrial textile according to claim 1, wherein the top members of each film structure is substantially planar.

3. The industrial textile according to claim 1, wherein the first and second end walls of each protrusion are compression resistant.

4. The industrial textile according to claim 1, wherein each film structure is constructed of a thermoplastic polymer material selected from the group consisting of polyethylene terephthalate (PET), polybutylene terephthalate (PBT), polyethylene naphthalate (PEN) and poly(cyclohexylene dimethylene terephthalate) acid (PCTA).

5. The industrial textile according to claim 1, wherein each film structure is constructed of a thermoset polymer material.

6. The industrial textile according to claim 5, wherein the thermoset polymer is a polyimide.

7. The industrial textile according to claim 1, wherein each film structure is constructed of a formable metal material selected from the group consisting of least one of aluminum alloy, brass, cold rolled steel, copper, galvanized steel, high strength low alloy steel, hot rolled steel, steel alloy, stainless steel and zinc.

8. The industrial textile according to claim 1, wherein the film thickness is in the range of 100 µm to 500 µm.

9. The industrial textile according to claim 1, wherein each film structure is constructed of polyethylene terephthalate (PET) and the film further comprises a radiant energy absorbent material.

10. The industrial textile according to claim 1, further comprising a surface pattern applied to at least the top members of some of the protrusions.

11. The industrial textile according to claim 1, wherein the protrusions of the first layer have a profile height which is greater than a profile height of the protrusions of the second layer.

12. The industrial textile according to claim 1, further including an integral seam region.

13. The industrial textile according to claim 1, comprising opposing seamable end regions, and a pair of seaming elements bonded to the respective opposing seamable end regions.

14. The industrial textile according to claim 1, for use in a process selected from the group consisting of conveyance, filtration and separation.

15. The industrial textile according to claim 14, wherein the process comprises papermaking, and the industrial textile is selected from a forming fabric, press felt, dryer fabric and a through-air dryer fabric.

* * * * *